Nov. 9, 1954     A. E. MEINKE     2,693,933
STOP VALVE
Filed Dec. 17, 1951
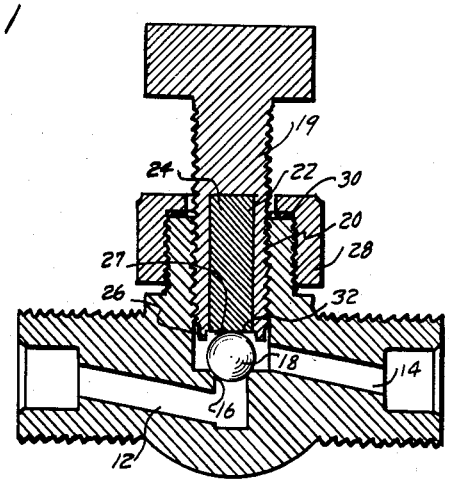
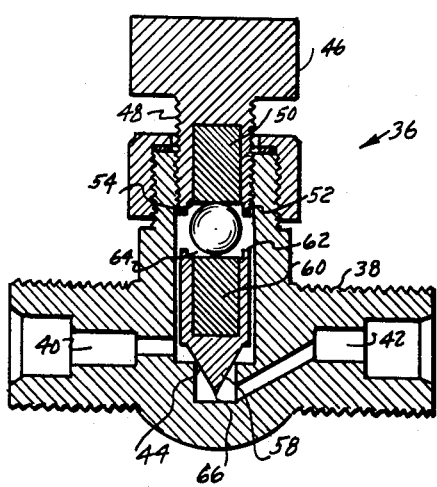
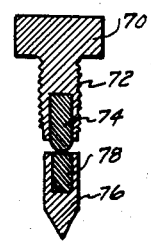
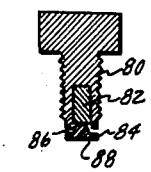
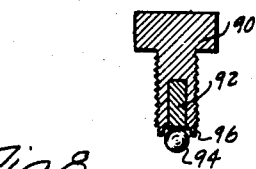
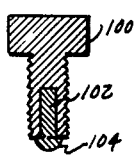
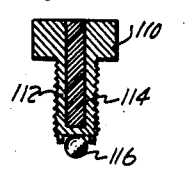
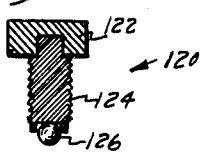
INVENTOR.
ARTHUR E. MEINKE
BY John L. Woodward
ATTORNEY

United States Patent Office 2,693,933
Patented Nov. 9, 1954

2,693,933

STOP VALVE

Arthur E. Meinke, Minneapolis, Minn.

Application December 17, 1951, Serial No. 262,059

3 Claims. (Cl. 251—65)

This invention relates to improvements in stop valves and especially valves employing a ball valve member.

The valves of this invention embody structure which can tightly seat the ball on its valve seat without tearing or galling the valve seat. The valves comprise means for permitting the ball to self-align itself with its seat if there should be any misalignment between the valve stem and the valve seat.

The valves essentially comprise a stem which carries a permanent magnet in its lower end adjacent a ball for holding the ball in engagement with the stem. The stem is provided with a recess in its lower end adjacent the permanent magnet which is of larger diameter than the diameter of the ball so that ball valve can move freely a limited distance in any direction so that the ball valve can easily and properly seat itself on its valve seat. The ball provides a point contact between the stem and this area of the point contact between the ball and stem is relatively smaller in area than the area of contact between the ball and the valve seat so that the ball will remain stationary on its seat when the stem is moved for tightly seating the ball on its valve seat.

It is an object of this invention to provide in a stop valve of the ball type a valve stem in which is mounted a permanent magnet for normally retaining a ball valve in engagement with the lower end of the valve stem when the ball valve is moved to open position with respect to its valve seat.

It is another object of this invention to provide in a stop valve, a valve stem having a permanent magnet and a separable valve member held in engagement therewith and the contact area between the valve stem and valve member being of relatively smaller area than the area of contact between the valve member and its seat so that the ball can be moved to tight engagement with its seat without being rotated on its seat thereby preventing undue tearing of the valve seat thus insuring longer life for the valve seat.

It is a still further object of this invention to provide in a stop valve of a stem having a permanent magnet for normally holding a separable valve member in engagement with the stem and of means for providing movement of the separable valve member with respect to the valve stem and the valve seat thereby providing a self-aligning valve.

It is also a further object of this invention to provide a simple, durable, and inexpensive but efficient valve capable of performing its intended purposes.

The novel features believed to be characteristic of the present invention are set forth with particularity in the appended claims. The invention itself, however, both as to its organization and manner of construction, together with further objects and advantages thereof, may best be understood by reference to the following description taken in connection with the accompanying drawings, in which:

Figure 1 is a sectional view in elevation of a needle valve constructed in accordance with the principles of the present invention.

Figure 2 is a sectional view in elevation of a modified type of needle valve.

Figure 3 is sectional view in elevation of portions of a needle valve disclosing another modified form of the invention.

Figure 4 is a sectional view in elevation of a still further modified form of needle valve disclosing the principles of this invention.

Figures 5, 6, 7, and 8 are sectional views in elevation of portions of a needle valve disclosing other modifications of the invention.

Referring in detail to the drawings by distinguishing reference numerals, a valve body 10 is provided with inlet passage 12, outlet passage 14 with a valve seat 16 interposed between the inlet and outlet passages 12 and 14 respectively. A ball valve 18 is adapted to seat tightly on the valve seat 16 when the valve stem 19 is turned downwardly. The valve stem 19 is provided with external screw threads for cooperating with internal screw threads in an opening 20 in the valve body 10 communicating with the valve seat 16. The valve stem 19 is provided with a pocket 22 in its lower portion for mounting a permanent magnet 24 in the valve stem 19. A peripheral ring 26 depends from the lower end of the valve stem 19 providing a recess 27 in the lower end of the valve stem 19 adjacent the permanent magnet 24 for receiving and protecting a portion of the ball valve 18 for a purpose hereinafter set forth.

A cap nut 28 is provided with internal threads cooperating with external threads on the valve body 10, and a suitable packing 30 carried in the cap nut 28 seals opening in the valve body 10 adjacent the valve stem 19 to prevent fluid leakages.

The recess 27 in the valve stem 19 is of greater diameter than the diameter of the ball valve 18 so that the ball valve 18 may have lateral movements in the recess 27 in the valve stem 19. During the manufacture of valve stems and valve seats in the valve bodies, either the stem or valve seat may be misaligned with respect to each other but with a valve stem using a cooperating ball valve which can be moved laterally with respect to the stem the ball valve can self-align itself with its valve seat. Finer adjustments can be obtained in my stop valve because the self-alignment obtained between the ball valve 18 and its valve seat permits better seating between the ball valve 18 and its seat than can be obtained in stop valves having no means of self-alignment between their valve members and seats. It is contemplated to use this valve in welding torches where fine adjustments of the valve are required to obtain the proper gas mixtures.

The permanent magnet 24 in the valve stem 19 will lift the ball valve 18 from the valve seat 16 in the valve body 10 when the stem 19 is screwed upwardly to permit the flow of a fluid such as gas, water, etc. When it is desired to close the valve, the stem 19 is screwed downwardly forcing the ball valve 18 tightly on the valve seat 16. As the stem 19 is turned to move the ball valve 18 to seat on the valve seat 16 in the valve body 10, the ball valve 18 is forced downwardly on the valve seat 16 without the ball valve rotating on the seat 16, thus the ball valve 18 will not gall or scar the valve seat 16 which scarring would permit gas leakage at the valve seat 16. The ball valve 18 remains stationary in a rotary motion when the valve stem 19 is turned down in its opening 20 in the valve body 10 because the point contact area 32 between the ball 18 and stem 19 is smaller than area of contact between the ball valve 18 and the valve seat 16.

The peripheral ring 26 on the lower end of the valve stem 19 limits the movement of the ball valve 18 in its lateral movements in the recess 27 in the valve stem 19. Also the peripheral ring 26 acts as a shield to prevent any downward flow of gas to dislodge the ball valve 18 from engagement with the lower end of the valve stem 19.

In Figure 2 is shown a non-stop valve 36 comprising valve body 38 provided with inlet and outlet passages 40 and 42 respectively and a valve seat interposed between the inlet and outlet passages. A valve stem 46 is mounted in an opening 48 in the valve body 38 communicating with valve seat 44 therein. The stem 46 comprises an upper element 48 provided with a pocket in its lower portion for receiving a permanent magnet 50. A peripheral ring 52 depends from the lower end of the stem element 48 providing a recess 54 for reception of a part of the ball member 56. A lower stem element 58 is provided with a pocket in its upper portion for carrying a permanent magnet 60 therein. A peripheral ring 62 projects upwardly providing a recess 54 in the upper end of the lower stem element 58 for reception of a part of the ball 56.

The recesses 54 and 64 in the upper stem element 48 and the lower stem element 58 have greater diameters than the diameter of the ball member 56 so that the ball can move laterally with respect to the two stem elements 48 and 58 respectively. The ball member 56 positioned freely between the stem elements 48 and 58 provides a swivel action for the valve stem 46 so that the valve stem will be self-aligning with respect to the valve seat 44 in the valve body 38. The permanent magnet 50 in stem element 48 and the permanent magnet 60 in the lower stem element 58 mutually attract the steel ball member 56 thus holding the stem element 48, ball member 56 and stem element 48 together in a unitary stem structure. The lower stem element 58 has a pointed lower end 66 so that the valve stem 46 can be seated on small valve seats such as valve seats employed in carburetors etc.

In the stem element 58 of the stem 48 shown in Figure 2, an iron or steel plug may be substituted for the permanent magnet.

In Figure 3 is shown another modified form of valve stem 70 consisting of an upper element 72 carrying a permanent magnet 74 in a pocket in its lower portion, and a lower stem element 76 carrying a permanent magnet 78 in a pocket in the upper portion of the stem element 76. The lower end of the permanent magnet 74 is rounded and is adapted to engage a flat top surface of the permanent magnet 78 carried in the stem element 76.

In Figure 4 is shown a still further modified valve stem 80 for a needle or non-stop valve carrying a permanent magnet 82 in a pocket in its lower portion. A valve member 84 having an upper semi-ball 86 of iron and a lower portion 88 of larger area than the semi-ball 86. The lower portion 88 is provided with a flat lower face so that it may be seated on a relatively larger valve seat than the seat for a ball valve.

It is possible as shown in Figure 5 to provide a valve stem 90 carrying a steel or iron plug 92 in a pocket in the lower portion of the stem which holds an independent permanent magnet in the shape of a ball valve 94. The stem 90 has a peripheral ring 96 providing a recess for preventing the ball being blown from the stem by a fluid.

In Figure 6 is shown a valve stem 100 carrying a permanent magnet 102 in a pocket in the lower portion of the stem 100 and a semi-ball 104 of steel or iron having its flat side 106 cooperating with the magnet 102 of the stem 100.

In Figure 7 a valve stem 110 is provided with a pocket 112 with its outlet in the top of the stem for carrying a permanent magnet 114 therein. The magnet 114 is therefor encased from contact with any liquids except at its top. This valve stem is adapted to be used in a valve arrangement wherein the flow of water etc. is to be controlled. The stem 110 is formed from brass or a plastic material. A valve body 116 is made of ball shape and being either chrome or bronze coated.

In Figure 8, the valve stem 120 comprises a handle 122 of plastic or other non-magnetic material with a shank 124 of steel which is magnetized to attract the steel ball valve member 126.

The valve stem may be of the slidable type rather than the screw type, and a permanent magnet is adapted to be carried by the stem so that a steel ball valve member can coact therewith.

The valve may be tapered at its edges for cooperating with a tapered valve seat in a valve body.

It is possible to fabricate the valve stems of a non-magnetic material which mounts a permanent magnet in a pocket in its lower end so that a ball valve member of steel or iron may cooperate therewith.

Heretofore the ball valve member has been spun into a recess at the lower end of a valve stem and as a consequence the greatest diameter of the ball could not be employed for seating on a valve seat. In the use of magnetic attraction between the ball valve member and the valve stem, where the ball valve member is a separate member from the stem, the greatest diameter of the ball can be employed for seating on a valve seat so that the ball valve can adequately seat on a larger valve seat than ball member which is spun into the valve stem.

While particular embodiments of this invention have been illustrated, it will be understood that the invention should not be limited thereto, since many modifications may be made and therefore it is contemplated by the appended claims to cover all such modifications as fall within the true spirit and scope of the invitation.

I claim as my invention:

1. A stop valve of the class described comprising a valve body having inlet and outlet passages, a valve seat interposed in the body between the inlet and outlet passages, said valve body being provided with an opening communicating with the valve seat, a valve stem mounted for adjustment in the opening in the body and having a lower end provided with an axially extending circumferential sleeve, a plug member disposed in said sleeve and having an outer end spaced inwardly slightly from the outer end of the sleeve to form a shallow recess therewith, a separable spherical ball valve for the valve seat normally held in the recess, one of said plug members or ball valves being a permanent magnet and the other being metallic so that the ball valve is held by magnetic attraction in the recess against the outer end of the plug member, the diameter of the recess being greater than the diameter of the ball and the recess being of a depth considerably less than the diameter of the ball so that the greater portion of the ball extends out of the recess whereby the ball may move laterally of the stem on the outer end of the plug member to be self-aligning with respect to the valve seat and whereby a relatively large area of the ball is provided to contact the valve seat.

2. A stop valve as claimed in claim 1, wherein said plug member is a permanent magnet made of a relatively hard alloy and the ball valve is metallic and is attracted to the exposed outer end of the plug member, the relatively hard plug member preventing the ball valve pitting its exposed surface during the adjustments of the valve stem in the body.

3. A stop valve as claimed in claim 1, wherein said ball valve is a permanent magnet and the plug member is metallic, the magnetic attraction between the parts holding the ball valve on the outer end of the plug member.

References Cited in the file of this patent

UNITED STATES PATENTS

| Number | Name | Date |
|---|---|---|
| 602,696 | Chateau | Apr. 19, 1898 |
| 1,409,127 | Wasem | Mar. 7, 1922 |
| 1,763,927 | Ireland | June 17, 1930 |
| 1,773,110 | Meyers | Aug. 19, 1930 |
| 2,307,723 | Anderson | Jan. 3, 1943 |
| 2,313,564 | Manly | Mar. 9, 1943 |